US009227344B2

(12) United States Patent
Schmalholz

(10) Patent No.: US 9,227,344 B2
(45) Date of Patent: Jan. 5, 2016

(54) DEVICE FOR FEEDING GRANULATE AND FILLER MATERIAL TO AN EXTRUDER SCREW OF AN EXTRUDER

(71) Applicant: BSW Machinery Handels-GmbH, Vienna (AT)

(72) Inventor: Peter Schmalholz, Vösendorf (AT)

(73) Assignee: BSW MACHINERY HANDELS-GMBH, Vienna (AT)

( * ) Notice: Subject to any disclaimer, the term of this patent is extended or adjusted under 35 U.S.C. 154(b) by 0 days.

(21) Appl. No.: 14/381,142

(22) PCT Filed: Feb. 19, 2013

(86) PCT No.: PCT/AT2013/000030
§ 371 (c)(1),
(2) Date: Aug. 26, 2014

(87) PCT Pub. No.: WO2013/126933
PCT Pub. Date: Sep. 6, 2013

(65) Prior Publication Data
US 2015/0023742 A1  Jan. 22, 2015

(30) Foreign Application Priority Data
Feb. 28, 2012 (AT) .................................. A 254/2012

(51) Int. Cl.
*B65G 53/48* (2006.01)
*B29B 7/60* (2006.01)
(Continued)

(52) U.S. Cl.
CPC ... *B29B 7/60* (2013.01); *B29B 7/66* (2013.01); *B29B 17/0005* (2013.01);
(Continued)

(58) Field of Classification Search
USPC .................. 406/53, 197; 366/133, 165.3, 186
See application file for complete search history.

(56) References Cited

U.S. PATENT DOCUMENTS 2,087,464 A * 7/1937 Ayers ............................... 55/436
2,800,238 A * 7/1957 Oliver ............................ 366/133
(Continued)

FOREIGN PATENT DOCUMENTS

DE  2 308 698 A1  9/1974
EP  0 252 249 A2  1/1988
(Continued)

OTHER PUBLICATIONS

International Search Report dated Jul. 16, 2013, issued in International Application PCT/AT2013/000030.
(Continued)

*Primary Examiner* — Joseph Dillon, Jr.
(74) *Attorney, Agent, or Firm* — Fitch, Even, Tabin & Flannery LLP

(57) ABSTRACT

A device for feeding granulate and filler material to an extruder screw of an extruder, includes a cyclone with an inlet opening for introducing a delivery flow of pneumatically delivered filler material and an outlet opening for discharging the filler material which has been separated from the delivery flow, a feed funnel for the fresh granulate and a mixing section, to which the separated filler material and the fresh granulate are fed from the feed funnel. The cyclone is disposed at least partially in the feed funnel and coaxial with the latter, so that the outlet opening of the cyclone extends into a feed funnel outlet region which surrounds the outlet opening in an annular manner, wherein a stuffing screw passes axially through the outlet opening of the cyclone and protrudes at least partially into the mixing section which axially adjoins the outlet opening.

8 Claims, 3 Drawing Sheets

(51) Int. Cl.
  *B29B 7/66* (2006.01)
  *B29B 17/00* (2006.01)
  *B29C 31/02* (2006.01)
  *B29C 31/10* (2006.01)
  *B29C 47/08* (2006.01)
  *B29C 47/10* (2006.01)
  *B29C 47/36* (2006.01)
  *B29C 47/38* (2006.01)
  *B29C 47/60* (2006.01)
  *B29C 47/66* (2006.01)
  *B29B 7/42* (2006.01)
  *B29B 17/04* (2006.01)

(52) U.S. Cl.
  CPC ............... *B29C 31/02* (2013.01); *B29C 31/10* (2013.01); *B29C 47/083* (2013.01); *B29C 47/0894* (2013.01); *B29C 47/1045* (2013.01); *B29C 47/369* (2013.01); *B29C 47/385* (2013.01); *B29C 47/6093* (2013.01); *B29C 47/661* (2013.01); *B29B 7/424* (2013.01); *B29B 7/425* (2013.01); *B29B 2017/042* (2013.01); *B29C 47/0823* (2013.01); *Y02W 30/62* (2015.05)

(56) References Cited

U.S. PATENT DOCUMENTS

| | | | | |
|---|---|---|---|---|
| 3,496,601 A | * | 2/1970 | McGill | 198/550.1 |
| 3,687,288 A | * | 8/1972 | Lynch et al. | 210/741 |
| 3,942,842 A | * | 3/1976 | Young, Jr. | 406/53 |
| 4,128,404 A | | 12/1978 | Stamatiou et al. | |
| 4,152,029 A | * | 5/1979 | Cowpertwait | 406/38 |
| 4,201,485 A | * | 5/1980 | Walker | 366/156.1 |
| 5,160,354 A | * | 11/1992 | Ascough | 95/242 |
| 5,327,947 A | * | 7/1994 | McGregor | 141/71 |
| 6,021,821 A | * | 2/2000 | Wegman | 141/93 |
| 6,089,795 A | * | 7/2000 | Booth | 406/43 |
| 7,585,102 B2 | * | 9/2009 | Bacher et al. | 366/147 |
| 8,820,214 B2 | * | 9/2014 | Green et al. | 99/287 |
| 2003/0035340 A1 | * | 2/2003 | Rowe et al. | 366/156.1 |

FOREIGN PATENT DOCUMENTS

| | | | |
|---|---|---|---|
| EP | 0 252 249 | A3 | 12/1989 |
| JP | S49-77963 | A | 7/1974 |
| JP | S49-136869 | U | 11/1974 |
| JP | H11-192618 | A | 7/1999 |
| JP | 2001-301009 | A | 10/2001 |
| WO | 86/00561 | A1 | 1/1986 |

OTHER PUBLICATIONS

International Preliminary Examination Report issued in International Application PCT/AT2013/000030.

\* cited by examiner

DEVICE FOR FEEDING GRANULATE AND FILLER MATERIAL TO AN EXTRUDER SCREW OF AN EXTRUDER

CROSS-REFERENCE TO RELATED APPLICATIONS

This Application is a U.S. National Stage Application filed under 35 U.S.C. §371 of International Application PCT/AT2013/000030, filed Feb. 19, 2013, designating the United States, which claims priority from Austrian Patent Application A 254/2012, filed Feb. 28, 2012, the complete disclosures of which are hereby incorporated herein by reference in their entirety for all purposes.

The invention relates to a device for feeding granulate and filler material to an extruder screw of an extruder, comprising a cyclone with an inlet opening for introducing a delivery flow of pneumatically delivered filler material and an outlet opening for discharging the filler material which has been separated from the delivery flow, a feed funnel for the fresh granulate and a mixing section, to which the filler material and the fresh granulate are fed from the feed funnel.

In the coating of fabric webs, for example fabric webs comprising monoaxially drawn polymer tapes, in particular polyolefin tapes, preferably polypropylene tapes, a considerable amount of waste occurs when the units are started up and thereafter during trimming of the coating. The most diverse proposals have already been made to enable the use of this waste and to increase the productivity. Thus, it is known, for example, to process this waste into regenerate and feed it back to the extruder. In particular, it has already been proposed to feed back the edge trim in strip form directly into the feed funnel of the extruder. However, considerable difficulties arise here, in particular because it is necessary for the cut-off edge strips to be drawn off at the same speed at which they arise and also to be drawn into the feed funnel of the extruder at this speed.

A further proposal therefore makes provision to cut the cut-off edge strips into shreds and to feed the shredded edge strips mixed with fresh granulate to the extruder screw. In DE 2308698 A, for example, it describes how the edge strips cut into shreds in the size reduction device are carried away pneumatically and the delivery flow is fed to a centrifugal force separator, in particular a cyclone, in which the shredded edge strips are separated from the delivery flow and fall into the delivery path of a vertical screw conveyor. The screw conveyor transports the shredded edge strands to a mixing section, in which the latter are mixed with fresh granulate. The mixture is then delivered to the extruder screw, in which the mixture is homogenised and melted.

A drawback of the described method is that the shredded waste tends towards bridge formation at the outlet opening of the cyclone, so that there is the risk of clogging of the outlet opening. The effect of the bridge formation is that the degree of filling of the screw conveyor varies or is reduced. There are a number of reasons for the bridge formation, such as for example the static charging of the shreds, the tendency of the shreds to agglomerate and the low weight of the, shreds. The smaller the size of the individual shreds, the greater the risk of the bridge formation. The tendency towards bridge formation is also dependent on a number of ambient conditions, such as for example on the ambient heat and the humidity, so that overall an uncontrollable and therefore unsatisfactory situation exists. The varying or reduced degree of filling of the screw conveyor leads on the one hand to an unreliable and fault-susceptible operation of the screw conveyor, so that frequent interruptions in the operation are required to remove any malfunctions. On the other hand, the proportion of the shreds in the extruder screw is thus reduced, so that a relatively larger quantity of fresh granulate is required, which increases the cost.

SUMMARY OF THE INVENTION

The invention therefore aims to constitute the return of the shredded waste into the extruder in a more reliable manner, wherein in particular a bridge formation of the shreds is intended to be avoided and the mass flow rate when the shreds are discharged from the cyclone is intended to be improved and made more uniform. The return or supply of any filler materials other than the mentioned shreds is also intended to be brought about. Finally, the design is to be as space-saving as possible, in order that the delivery paths can be shortened.

To solve this object, the invention essentially provides a device of the initially mentioned kind such that the cyclone is disposed at least partially in the feed funnel and coaxial with the latter, so that the outlet opening of the cyclone extends into a feed funnel outlet region which surrounds the outlet opening in an annular manner, and that a stuffing screw passes axially through the outlet opening of the cyclone and protrudes into the mixing section which axially adjoins the outlet opening. As a result of the fact that the filler material, in particular the shreds, is not discharged with the aid of a screw running vertically and beneath the outlet opening, but rather by means of a stuffing screw passing axially through the outlet opening, it is possible to increase substantially the degree of filling of the screw. Clogging of the outlet opening due to agglomerated filler material is prevented by the fact that the filler material is no longer discharged solely due to gravity, but is forcibly conveyed with the aid of the stuffing screw through the outlet opening. Clogging is prevented in the inflow region of the stuffing screw by that the air circulation in the interior of the cyclone keeps the filler material loose.

DETAILED DESCRIPTION

Figure 1:
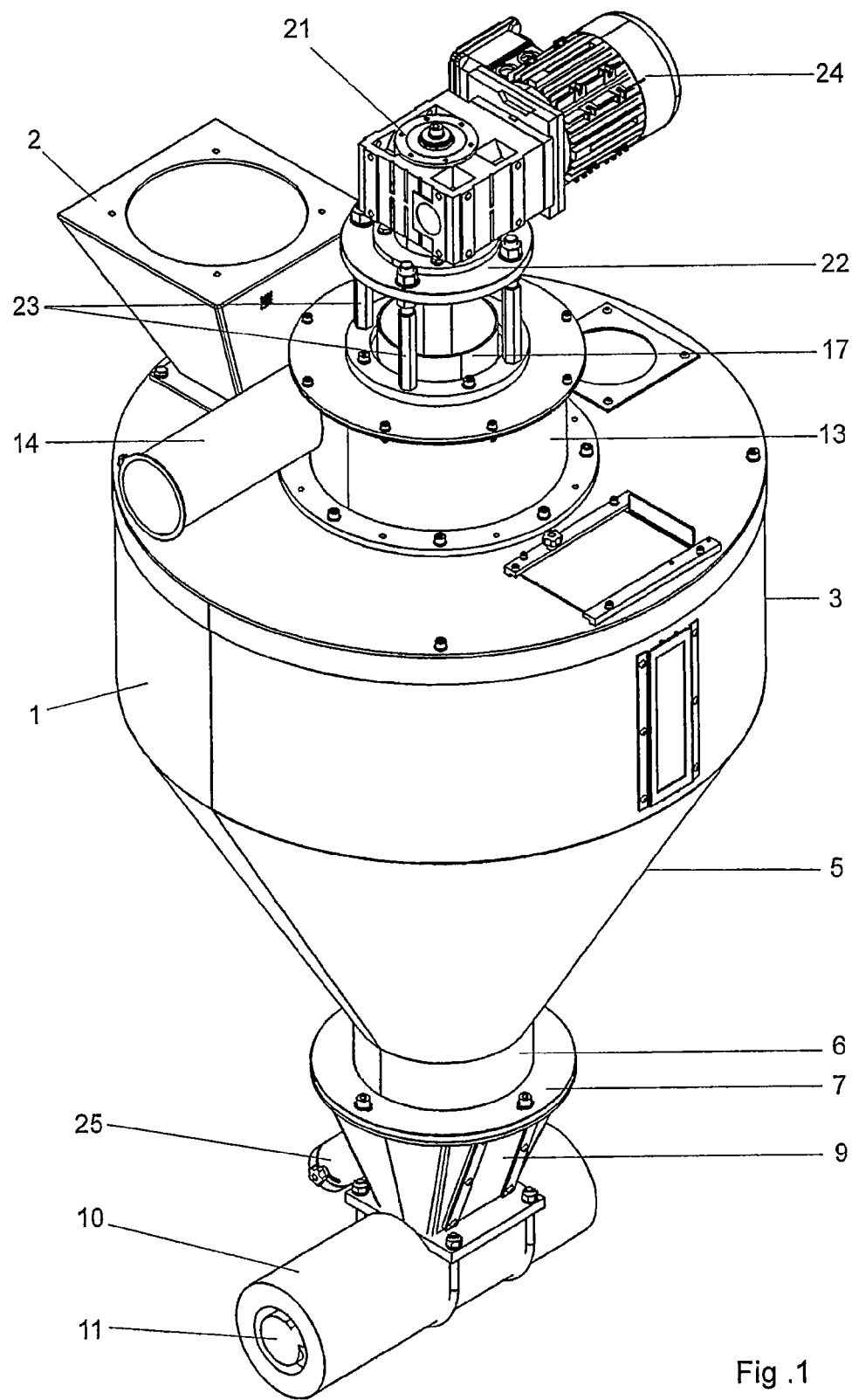
FIG. 1 shows a perspective view of an embodiment.

The coaxial arrangement of the cyclone and the feed funnel for the fresh granulate leads to an extremely compact design, which does not require long transport paths. The reliability is thus increased and the operating costs are minimised. The outlet opening of the cyclone dips into a feed funnel outlet region which surrounds the outlet opening in an annular manner, so that the filler material is mixed with the fresh granulate immediately after its exit from the cyclone. Vertical transport to a separate mixing device is therefore not necessary, but rather the mixing takes place in a mixing section which axially adjoins the outlet opening, wherein the mixing or the further transport through this mixing section is promoted by the fact that the stuffing screw protrudes into the mixing section. The stuffing screw preferably extends through the entire mixing section and ends directly above the extruder screw running at right angles to the stuffing screw. This leads to an increase in the degree of filling of the extruder screw.

A preferred embodiment provides that the shaft of the stuffing screw passes axially through the cyclone and is led out of the cyclone via an immersion tube. A suitable drive engages with the shaft in the led-out portion in order to cause the shaft to rotate.

A particularly efficient discharge of the filler material out of the cyclone is preferably achieved by that the cyclone comprises a conically tapering separating section and a cylindrical delivery region adjacent thereto, through which the stuffing screw extends and the internal diameter of which essentially corresponds to the external diameter of the stuffing screw.

The degree of filling of the stuffing screw is advantageously further increased by that the stuffing screw in the lowest portion of the separating section comprises a conical enveloping surface converging in the transport direction. It is thus ensured that the filler material accumulating at the lower end of the separating section of the cyclone is pushed into the inflow region of the cylindrical delivery region. The effect of the conical initial section of the stuffing screw is also that the stuffing screw, in the event of a possible breakage of its shaft, cannot fall through the outlet opening out of the cyclone and collide with the extruder screw, which would lead to considerable damage to the plant parts.

A further preferred development provides that the mixing section is constituted funnel-shaped with a cross-section tapering in the transport direction. This leads to compacting of the mixture of fresh granulate and filler material and consequently to better homogenisation of the mixture in the extruder screw.

A further reduction in the transport paths is preferably achieved by that the mixing section comprises an outlet opening which can adjoin the extruder screw and that the stuffing screw extends up to the outlet opening.

In order to avoid co-rotation of the filler material delivered with the stuffing screw, a preferred development provides that the cylindrical delivery region comprises grooves running in the longitudinal direction on its internal circumference cooperating with the stuffing screw. The depth of the grooves advantageously diminishes continuously in the transport direction, i.e. the grooves run out. The coefficient of friction of the delivered material on the cylindrical internal wall in the grooved feed-in zone of the screw is markedly increased by the provision of the aforementioned grooves.

The invention will now be explained in more detail by way of an exemplary embodiment represented schematically in the drawing.

Figure 2:
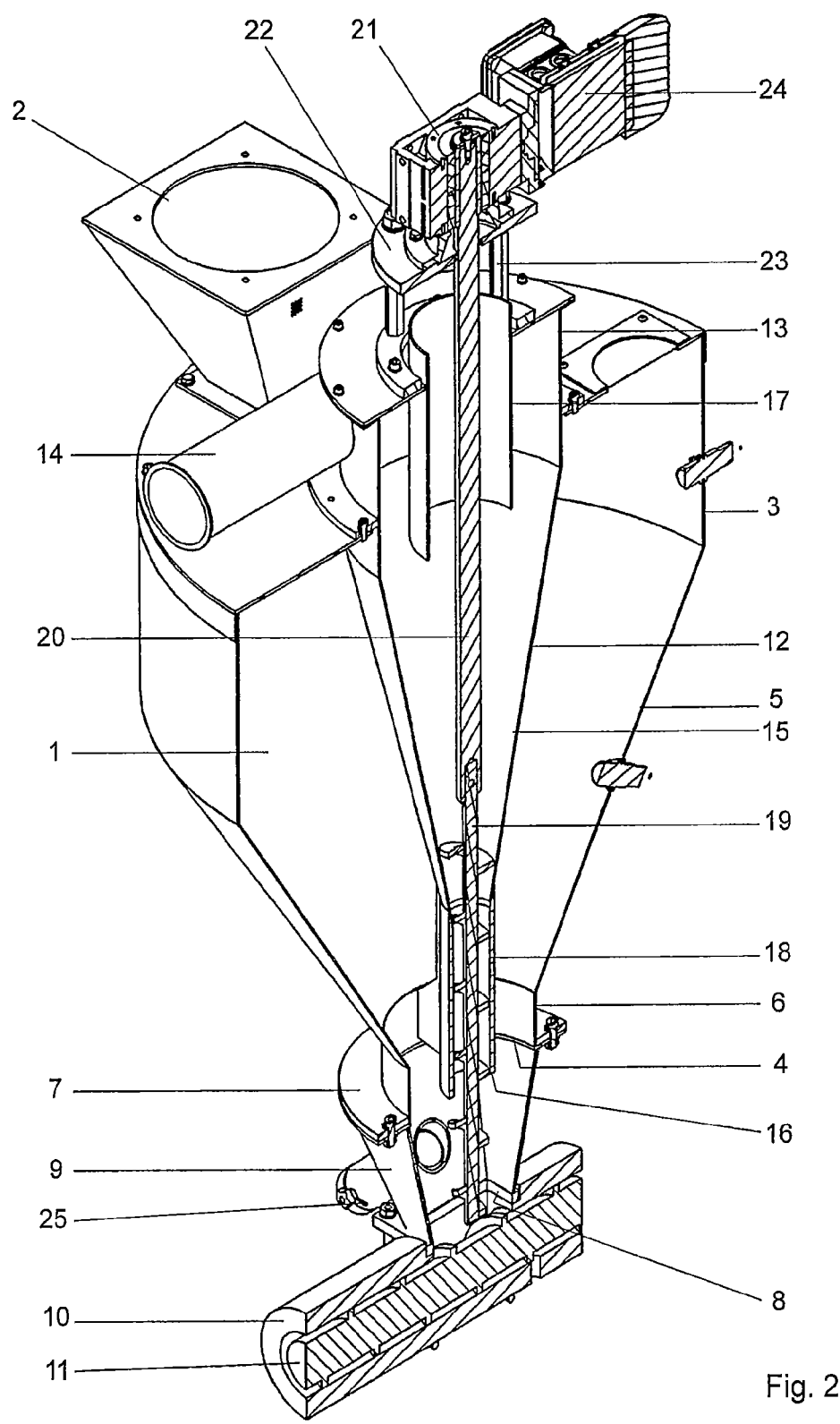
FIG. 2 shows a perspective cross-sectional view of an embodiment of FIG. 1.
Figure 3:
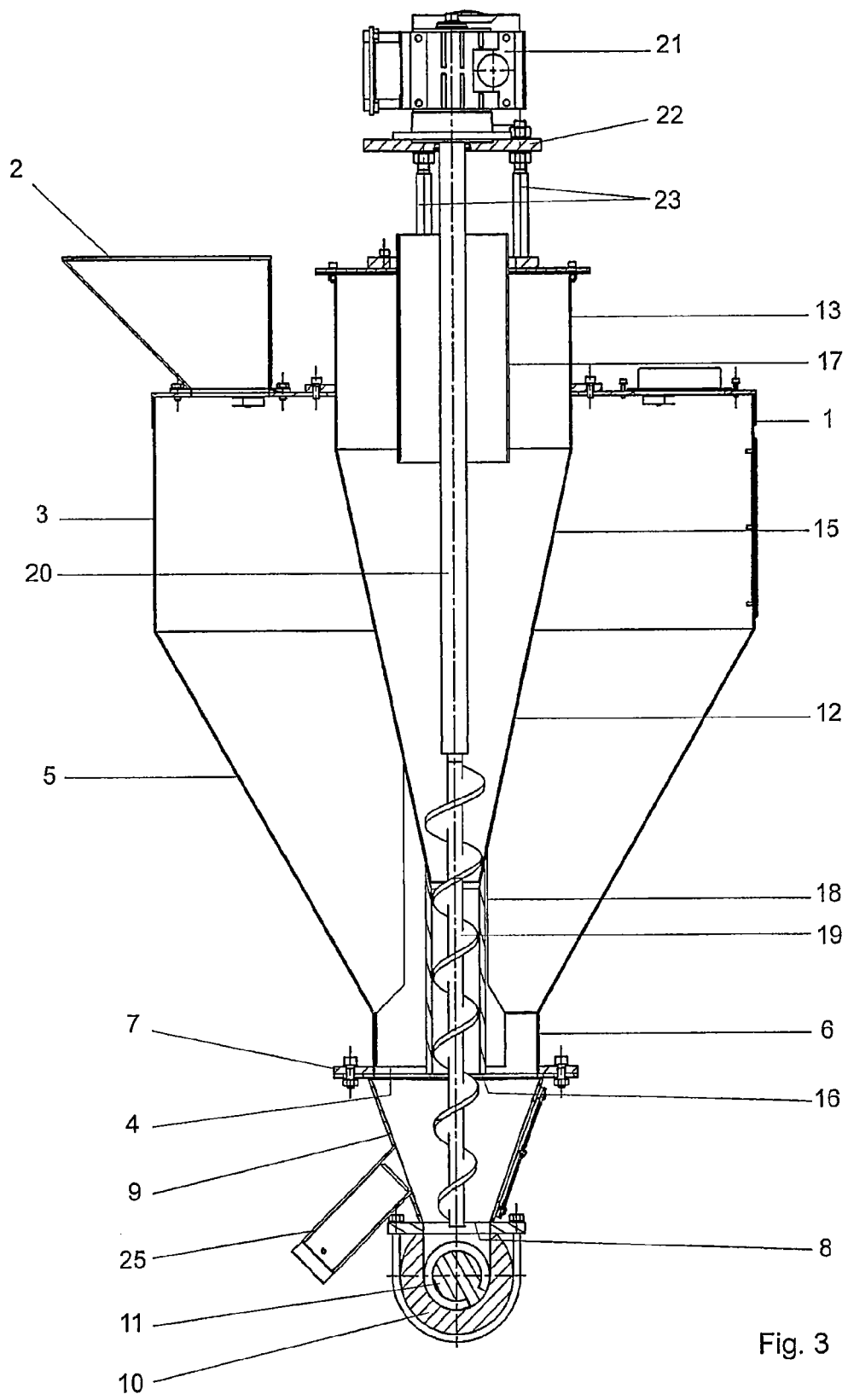
FIG. 3 shows a cross-sectional view along a plane orthogonal to an extruder screw.

In the latter, FIG. 1 shows a perspective view of the device according to the invention, FIG. 2 shows a perspective cross-sectional view of the device according to FIG. 1 and FIG. 3 shows a cross-sectional view along a plane orthogonal to the extruder screw.

FIG. 1 shows a feed funnel 1 for fresh granulate, the granulate delivery whereof is denoted by 2. The feed funnel comprises a first cylindrical section 3 and an adjoining funnel-shaped section 5, i.e. tapering conically towards outlet opening 4. Adjoining funnel-shaped section 5 is a cylindrical delivery region 6 with an annular flange 7, to which a funnel-shaped transport section 9, i.e. tapering conically towards outlet opening 8, is fixed, said transport section constituting a mixing section. Transport section 9 is connected to delivery tube 10 of an extruder screw 11.

As can be seen still better in FIGS. 2 and 3, a cyclone 12 is disposed coaxially in feed funnel 1, inflow cylinder 13 of which cyclone protrudes out of feed funnel 1. Emerging tangentially into inflow cylinder 13 is a tube 14, via which a delivery flow of filler material, in particular of shredded waste, is fed to cyclone 12. In inflow cylinder 13, the introduced delivery flow is brought by tangential blowing-in onto a circular path. The rotational speed increases due to the tapering of adjoining cone 15 constituting the separating section, in such a way that the shreds are flung by the centrifugal force against the cone walls and decelerated to an extent such that they become detached from the flow and trickle downwards in the direction of outlet opening 16. The conveying medium, in particular air, leaves cone 15 through central immersion tube 17 upwards.

It can be seen in FIGS. 2 and 3 that cyclone 12 comprises, in the connection with cone 15, a cylindrical delivery section 18, at the end whereof outlet opening 16 is located. Stuffing screw 19 passes through cylindrical delivery section 18 and outlet opening 16 in the axial direction and is connected to a drive shaft 20, which is led via immersion tube 17 out of the cyclone. The drive shaft is mounted in a gear unit 21, which is fixed to a platform 22, which is supported by a plurality of uprights 23 at the top wall of cyclone 12. A motor 24 drives drive shaft 20 via gear unit 21. Stuffing screw 19 cooperates with cylindrical delivery section 18 for the axial discharge of the shreds accumulating at the lower end of cone 15. Directly above cylindrical delivery section 18, i.e. in the lowest section of cone 15, stuffing screw 19 comprises a conical enveloping surface which tapers towards cylindrical delivery section 18, as a result of which the degree of filling of stuffing screw 19 can be increased. Stuffing screw 19 also protrudes via outlet opening 16 out of cyclone 12 and extends into the mixing section formed by funnel-shaped transport section 9 up to extruder screw 11. Provided in transport section 9 is a maintenance and inspection opening with a tube 25, via which any irregularities during operation, such as for example clogging, can be removed.

The invention claimed is:

1. A device for feeding granulate and filler material to an extruder screw (11) of an extruder, comprising
    a cyclone (12),
    a cyclone inlet opening for introducing a delivery flow of pneumatically delivered filler material into the cyclone (12), a cyclone outlet opening (16) from the cyclone (12) for discharging the filler material which has been separated from the delivery flow,
    a feed funnel (1) for introducing fresh granulate,
    an outlet region (6) to the feed funnel (1), wherein the outlet region (6) annularly surrounds the cyclone outlet opening (16),
    a mixing section (9) to receive filler material and fresh granulate from the feed funnel (1), wherein the mixing section (9) axially adjoins the cyclone outlet opening (16), and
    a stuffing screw (19)
    wherein the cyclone (12) is disposed at least partially in the feed funnel (1) and coaxial with the latter, so that the cyclone outlet opening (16) extends into the outlet region (6), and the stuffing screw (19) passes axially through the cyclone outlet opening (16) and protrudes into the mixing section (9).

2. The device according to claim 1, wherein said device further comprises an immersion tube (17) and the stuffing screw (19) has a shaft that passes axially through the cyclone (12) and is led out of the cyclone (12) via the immersion tube (17).

3. The device according to claim 1, wherein the cyclone (12) comprises a conically tapering separating section (15) and a cylindrical delivery region (18) adjacent thereto, through which the stuffing screw (19) extends and the internal diameter of which essentially corresponds to the external diameter of the stuffing screw (19).

4. The device according to claim 3, wherein the stuffing screw (19) in the lowest portion of the separating section (15) comprises a conical enveloping surface converging in the transport direction.

5. The device according to claim 1, wherein the mixing section (9) is constituted funnel-shaped with a cross-section tapering in the transport direction.

6. The device according to claim 1, wherein the mixing section (9) comprises an outlet opening (8) which can adjoin the extruder screw (11) and that the stuffing screw (19) extends up to the outlet opening (8).

7. The device according to claim 3, wherein the cylindrical delivery region (18) comprises grooves running in the longitudinal direction on its internal circumference cooperating with the stuffing screw (19).

8. A method for returning plastic waste accumulating in an extrusion process, in particular edge strips, into an extruder having an extruder screw (11), wherein said method comprises:

engaging the plastic waste, after its accumulation, by mechanical means, transporting the engaged plastic waste into a size reduction device, shredding the plastic waste, and thereafter feeding the shredded plastic waste with fresh granulate to the extruder screw (11) in a device comprising a cyclone (12), a cyclone inlet opening for introducing a delivery flow of pneumatically delivered filler material into the cyclone (12), a cyclone outlet opening (16) from the cyclone (12) for discharging the filler material which has been separated from the delivery flow, a feed funnel (1) for introducing fresh granulate, an outlet region (6) to the feed funnel (1), wherein the outlet region (6) annularly surrounds the cyclone outlet opening (16), a mixing section (9) to receive filler material and fresh granulate from the feed funnel (1), wherein the mixing section (9) axially adjoins the cyclone outlet opening (16), and a stuffing screw wherein the cyclone (12) is disposed at least partially in the feed funnel (1) and coaxial with the latter, so that the cyclone outlet opening (16) extends into outlet region (6), and the stuffing screw (19) passes axially through the cyclone outlet opening (16) and protrudes into the mixing section (9).

\* \* \* \* \*